United States Patent [19]

McCain, Jr. et al.

[11] 3,860,656

[45] Jan. 14, 1975

[54] PURIFICATION OF GLYOXAL

[75] Inventors: James Herndon McCain, Jr.; Louis Foster, both of Charleston, W. Va.

[73] Assignee: Union Carbide Corporation, New York, N.Y.

[22] Filed: June 8, 1972

[21] Appl. No.: 261,019

[52] U.S. Cl. ... 260/601 R, 260/501.1, 260/567.6 M, 260/583 N
[51] Int. Cl. ............................................ C07c 47/12
[58] Field of Search ......................... 260/601 R, 59

[56] References Cited
OTHER PUBLICATIONS

Dyrssen et al., ed. "Solvent Extraction Chemistry," pp. 349–361, (Amine Extraction System by R. Deamond) Wiley, N.Y. (1967).

Dyrssen et al., ed. "Solvent Extract. Chem." pp. 426–432, (Base Strengths of Amines in Liquid–Liquid Extraction Systems by Arinstead) Wiley, N.Y. (1967).

*Primary Examiner*—Joseph E. Evans
*Assistant Examiner*—D. B. Springer
*Attorney, Agent, or Firm*—Francis M. Fazio

[57] ABSTRACT

Aqueous glyoxal solutions are deacidified by the continuous liquid-liquid countercurrent extraction thereof with an organic solvent solution of a high molecular weight tertiary amine that is essentially insoluble in water, such as a solution of tricaprylylamine in isopropyl acetate. The organic solvent solution can be washed to remove picked-up impurities and recycled.

5 Claims, No Drawings

PURIFICATION OF GLYOXAL

BACKGROUND OF THE INVENTION

Aqueous glyoxal is produced commercially by the nitric acid oxidation of acetaldehyde. The aqueous glyoxal solutions so produced contain small amounts of nitric acid and carboxylic acids that can be present at concentrations up to about one per cent nitric acid and up to about ten per cent carboxylic acids calculated as acetic acid. The removal of these acids is important in order to obtain a satisfactory commercial product, and many procedures have been disclosed for accomplishing this. Thus, solid, basic substances such as anion exchange resins or basic salts have been used to neutralize the acids in German Pat. No. 1,154,081, French Pat. No. 1,326,605, Netherlands Application No. 69/06,867, U.S. Pat. No. 2,286,125 and U.S. Pat. No. 3,270,062. Conversion of the glyoxal to a volatile compound followed by purification by distillation and regeneration of glyoxal has been disclosed in U.S. Pat. No. 2,246,049, U.S. Pat. No. 2,463,030 and British Pat. No. 516,740. In addition, purification by partial crystallization, German Pat. No. 932,369, and deacidification by electrodialysis, U.S. Pat. No. 3,507,764, have been disclosed. Notwithstanding the different methods known and used, the efforts to find better, more economical methods continues unabated.

SUMMARY OF THE INVENTION

It has now been found that aqueous glyoxal solutions can be purified by a continuous liquid-liquid countercurrent extraction process by the countercurrent flow of two solutions, the first solution being an aqueous glyoxal solution and the second solution being an organic solvent solution of a high molecular weight amine which organic solvent is insoluble in water. This purification process serves to remove the nitric acid and the carboxylic acid impurities. The amines used are the tertiary amines that are soluble in the organic solvent and whose acid salts are also soluble in the organic solvent but which are essentially insoluble in water.

DESCRIPTION OF THE INVENTION

In the process of this invention the aqueous glyoxal solution obtained from the nitric acid oxidation reaction of acetaldehyde is introduced at a point or points into the upper portion of an extraction column and an organic solvent solution of a high molecular weight amine is introduced at a point or points into the lower portion of the extraction column. The two solutions are permitted to flow countercurrently while their respective flow rates are adjusted by known engineering principles. As the process proceeds the organic solvent solution of the high molecular weight amine reacts with the acidic impurities in the aqueous glyoxal solution and, due to a density differential between the two solutions, rises to the top of the extraction column and exits therefrom. It is desirable, though not necessary, to introduce into the topmost section of the extraction column, at a point above the inlet point of the aqueous glyoxal solution and below the exit point of the organic solvent solution of the high molecular weight amine, a small stream of water to backwash the exiting organic solvent phase and limit glyoxal loss. Simultaneous with the outward flow of the organic solvent phase from a point at the top of the column a purified aqueous glyoxal solution exits from a point at the bottom of the column. The recovered aqueous glyoxal solution has a decreased content of acid impurities than the material initially introduced into the upper portion of the extraction column.

The purified aqueous glyoxal solution recovered from the bottom of the column is then treated by conventional means to remove entrapped organic solvent, amine or other impurities, and concentrated to the desired concentration. Thus, following the extraction purification, the glyoxal solution recovered from the bottom of the column can be steam stripped to remove dissolved organic solvent, percolated through an absorbent bed to remove suspended amine or other solid particles (e.g., a carbon black bed) and then treated in the conventional manner to recover the glyoxal at the desired concentration. These procedural steps are all well known in the art and do not require unnecessary repetition here.

The organic solvent solution of the high molecular weight amine recovered from the top of the column contains therein the extracted acid impurities in the forms of their salts as a result of their reaction with the amine. This organic solvent phase is treated with a regenerant which is a base whose base strength is greater than that of the amine used and the free amine is regenerated while the acid impurities extracted from the glyoxal react with the regenerant to form salts therewith that are then removed. Suitable regenerants are sodium hydroxide, potassium hydroxide, ammonium hydroxide, sodium carbonate, lime, ammonia, or any other suitable base. After removal of the salts, the regenerated amine is washed with water to remove the last traces of regenerant and recycled.

As compared to the known methods previously used, the instant method has many advantages. Thus, the previously used ion exchange resin methods for removing the acid impurities were batch methods requiring high dilution to remove the glyoxal from the solid ion exchange resin. Whereas, the instant method is continuous and little or no dilution is involved. The known distillation and recrystallization procedures were expensive and resulted in high glyoxal losses. Whereas, the instant method is less expensive, continuous, and recovery of glyoxal is virtually quantitative. In the known electrodialysis method the recovery of glyoxal is in the range of 85 to 95 per cent and a residence time in the equipment of about eight hours is required. Whereas, the instant method gives virtually a quantitative recovery of glyoxal and requires a residence time of about 1 hour.

The acid-impurity containing aqueous glyoxal solutions that can be purified by this process are those obtained directly from the nitric acid oxidation of acetaldehyde or those which have been given a preliminary purification and/or concentration after the oxidation reaction. The glyoxal concentration in said solution can vary from 5 to 55 per cent by weight, and the acids are generally present as impurities at concentrations up to about two per cent nitric acid and up to about ten per cent carboxylic acids calculated as acetic acid. In the process of this invention where the initial acid content of the glyoxal solution was approximately ten per cent, it has been possible to recover glyoxal solutions wherein the acids remaining after treatment by this process are less than one per cent of the acids originally present. Such low concentration have not heretofore been so readily obtainable except by using extreme purification techniques.

The high molecular weight amines suitable for use in this invention are the tertiary amines which are essentially insoluble in water and whose acid salts are insoluble in water; the amines and their acid salts, however, are soluble in the organic solvent used to dissolve the amine. The suitable amines can be determined by a simple laboratory solution experiment merely by determining their solubility. Among those that can be used are trilaurylamine, methyldioctylamine, trioctylamine, tridecylamine, trihexylamine, triheptylamine, methyldistearylamine or methyldicetylamine. In general, at leat 17 carbon atoms per nitrogen atom are desired for the amine to display the required water insolubility in the salt form. Also useful are the known quarternary ammonium salts in bicarbonate form such as methyltrilaurylammonium bicarbonate, dimethyldioctylammonium bicarbonate, methyltrioctylammonium bicarbonate, methyltridecylammonium bicarbonate, tetraamylammonium bicarbonate, dimethyldistearylammonium bicarbonate or trimethylstearylammonium bicarbonate. The preferred amines are those which do not have undesirable side effects on the system, such as emulsification of the system or reaction with the glyoxal. A preliminary laboratory screening is used to determine whether or not undesirable side effects will be encountered.

The organic solvents used to prepare the amine solution include any solvent capable of dissolving the amine at the concentration required and having a specific gravity such that the amine solution thereof has a specific gravity less than the specific gravity of the aqueous glyoxal solution and consequently will flow upwardly in the extraction column and afford phase separation; it is also only slightly soluble in aqueous glyoxal solutions. In addition, it should not cause any undesirable emulsion or coagulation or other side reactions in the column. Illustrative of suitable organic solvents are isopropyl acetate, butyl acetate, amyl acetate, ethyl acetate, propyl acetate, phenyl acetate, diethyl ether, diisopropyl ether, dibutyl ether, methyl ethyl ketone, methyl propyl ketone, methyl isobutyl ketone, hexane, octane, heptane, nonane, benzene, toluene, and the like.

The concentration of the tertiary amine in the organic solvent can vary from about 5 to about 50 per cent by weight and is preferably from 15 to 40 per cent by weight.

The purification is carried out at a pressure ranging from about 0.5 atmosphere to about 10 atmospheres; preferably from 1 to 5 atmospheres. The temperature can be from 0°C. to about 100°C. or higher and is preferably from 20°C. to 50°C.

The ratio of aqueous glyoxal solution to organic solvent amine solution fed into the column can vary from 1:1 to 1:10 by volume. This, of course, will vary and depends upon the concentration of amine and glyoxal in their respective solutions, as well as the amount of acid impurities present. This is now an obvious point to one skilled in the art and he is well trained to make the necessary adjustments.

In a typical reaction, a single extraction column is used, which can be a packed or unpacked column. However, one can carry out the reaction using a series of two or more extraction columns whereby the purified aqueous glyoxal solution recovered from the first column is further purified by a subsequent similar treatment in a second or additional column or columns.

The invention is illustrated by the following examples.

EXAMPLE 1

The extraction column used in this example was eight feet long and one inch in diameter. At a point three-fourths of the way up the column 1,050 cc. of a 14.6 per cent aqueous glyoxal solution having a 1.44 per cent acid content (calculated as acetic acid) was fed into the column at a rate of 15 cc. per minute. This glyoxal solution was obtained from a conventional nitric acid oxidation of acetaldehyde. The excess acetaldehyde and volatile organic acids that may have formed had been removed by steam distillation. Water was fed in at the top of the column at a rate of 1.5 cc. per minute. A 30 per cent solution of tricaprylylamine in isopropyl acetate was fed in at the bottom of the column at a rate of 20 cc. per minute. The reaction was carried out at 25°C. and atmospheric pressure. There was recovered from the base of the column 1,400 cc. of purified, deacidified glyoxal solution having an average acidity of 0.01 per cent. The acid analysis of the purified product recovered indicated that about 99 per cent of the acid impurities had been removed.

The purified aqueous glyoxal recovered was evaporated to 900 grams in vacuo at 60°C. to remove dissolved isopropyl acetate, then percolated first through 50 cc. of activated carbon black and then through 50 cc. of cation exchange resin of the strong (sulfonic) acid type on a styrene divinylbenzene backbone contained in a 100 ml. burette. The solution recovered was then further concentrated to yield 336 grams of 40 per cent aqueous glyoxal solution having an acid content of 0.078 per cent. After standing for one month at room temperature it had a visual color of 5 Pt. After being heated at 100°C. for 2 hours, the color increased to only 60 Pt. When the sample was neutralized to a pH of 5.5 with 30 per cent sodium acetate and then heated at 60°C. for 30 minutes, the color increased to only 40 Pt. These values indicate the commercial suitability of the refined product.

The organic solvent raffinate recovered from the top of the column was reacted with 27 per cent ammonium hydroxide and the tricaprylylamine was recovered, washed with water and was available for recycling and reuse.

EXAMPLE 2

A continuous five-day run was carried out during which time the isopropyl acetate solution of tricaprylylamine was recycled 87 times; the concentration of the tricaprylylamine in the solution was maintained at 20 per cent by weight. The extraction column was a 22 stage column eight feet long and one inch in diameter and the wash column used to wash the tricaprylylamineisopropyl acetate solution to remove residual base was an 11 stage column four feet long and one inch in diameter; stirrers were present in both columns. The equipment was interconnected with the necessary pumps and lines.

During the operation of this run, the solution of tricaprylylamine in isopropyl acetate was introduced into the extraction column at the bottom of the column at a rate of 20 cc. per minute. At a point six feet from the bottom of the extraction column, a 12 per cent aqueous glyoxal solution from a nitric acid oxidation reaction of acetaldehyde obtained as described in Example 1 and containing 2.5 per cent acid impurities (calculated as acetic acid) was introduced into the extraction column. Water was fed into the top of the column at a rate of 3 cc. per minute. The interface in the extraction column was controlled at a level just above the inlet point of the aqueous glyoxal solution. The deacidified, purified glyoxal solution was recovered from the bottom of the extraction column and the raffinate exited from the top of the column into the regenerating section for regeneration and recycle. The acidity of the composite purified glyoxal for each day of operation was as follows:

| Acidity of Composite Glyoxal, % | |
| --- | --- |
| 1st day | 0.029 |
| 2nd day | 0.030 |
| 3rd day | 0.032 |
| 4th day | 0.035 |
| 5th day | 0.045 |
| | 0.034 Average |

The data shows that 98.6 per cent of the acidic impurities were removed by the instant process.

A four-liter sample of the deacidified 10.95 per cent aqueous glyoxal obtained during the second day of operation was evaporated in vacuo at 35°C. to 2.5 liters. This concentrate was percolated through 50 cc. of activated carbon and 200 cc. of the same ion exchange resin described in Example 1 at the rate of 15 cc. per minute and it was then further concentrated to yield 905 grams of a 40 per cent aqueous glyoxal solution having an acidity of 0.143 per cent.

A six-liter sample of the deacidified 11.0 per cent aqueous glyoxal obtained during the third day of operation was evaporated in vacuo at 35°C. to four liters. This concentrate was percolated through 50 cc. of activated carbon, 200 cc. of a weakly basic ion exchange resin which consisted of dimethylamino groups on a phenol-formaldehyde backbone and 200 cc. of the ion exchange resin used in Example 1 at a rate of 15 cc. per minute. The activated carbon was contained in a 100 cc. burette and the anion and cation exchange resins were each contained in glass tubes 4 cm. in diameter by 100 cm. in length fitted with stopcocks. In all instances the flow was by gravity with regulation by the stopcock. The purified product was finally evaporated to yield 1,041 grams of a 40 per cent aqueous glyoxal solution having an acidity of 0.021 per cent.

To the raffinate exiting from the top of the extraction column, at a rate of 20 cc. per minute, there was added one cc. per minute of 27 per cent ammonium hydroxide solution. This stream passed into a decanter in which a constant two phase-interface level was maintained. The lower aqueous phase was removed and discarded and the upper amine-organic solvent phase was introduced into the bottom of the wash column. Water was added to the top of the wash column at a rate of 12 cc. per minute. The interface was controlled at a point just above the point at which the organic solvent solution of the tricaprylylamine entered the wash column. The rinse water exited from the bottom of the wash column after removing traces of ammonia from the organic phase, and was discarded. The purified isopropyl acetate solution of the tricaprylylamine was recycled after adding any tricaprylylamine and isopropyl acetate necessary to maintain the volume and the concentration of tricaprylylamine at 20 per cent; this make up was generally less than several per cent per 100 cycles.

EXAMPLE 3

The procedure followed in this example was that described in Example 2. The process was carried out continuously for a total of 250 recycles of the tricaprylylamine-isopropyl acetate solution. In this example the wash column was extended to a total of eight feet in length, regeneration was effected with gaseous ammonia rather than 27 per cent ammonium hydroxide and the wash water flow into the wash column was 2 cc. per minute rather than 12 cc. per minute.

The aqueous glyoxal solution charged during this continuous run had a glyoxal content of 11.8 per cent and an acid impurity content of 1.85 per cent (calculated as acetic acid). The purified, deacidified aqueous glyoxal was concentrated to a 40 per cent aqueous glyoxal content as described in Example 2, the quality of this product was excellent and the concentrated glyoxal had an average acid content of 0.05 per cent. The acid content at selected cycle periods before the aqueous glyoxal solution was concentrated to the 40 per cent concentration is indicated in the following table:

| Cycle No. | Acid Content, % |
| --- | --- |
| 10 | 0.03 |
| 50 | 0.04 |
| 75 | 0.05 |
| 100 | 0.07 |
| 125 | 0.07 |
| 150 | 0.07 |
| 175 | 0.08 |
| 200 | 0.08 |
| 225 | 0.08 |
| 250 | 0.09 |

EXAMPLE 4

Following the procedure described in Example 3, and using the same equipment, an aqueous glyoxal solution having a glyoxal content of 12.0 per cent and an acid impurity content of 2.05 per cent (calculated as acetic acid) was deacidified. In this run, the tricaprylylamine-isopropyl acetate solution was recycled 500 times during the continuous operation, with 12 grams make-up tricaprylylamine added at the one hundredth cycle and 85 grams make-up tricaprylylamine added at the three hundred twenty first cycle to the isopropyl acetate solution thereof. The total of 97 grams of tricaprylylamine added as make-up over the 500 cycles of continuous operation represents approximately 30 per cent of the initial charge of tricaprylylamine to the system. The purified, deacidified aqueous glyoxal was concentrated to a 40 per cent aqueous glyoxal content as described in Example 2; the quality of this product was excellent and the concentrated glyoxal had an average acid content of 0.05 per cent. In this continuous run, the effect of the interface in the wash column was investigated and it was found that it is preferably located near the bottom of the wash column for maximum benefit. The acid content at selected cycle periods before the aqueous glyoxal solution was concentrated to the 40 per cent concentration is indicated in the following table:

| Cycle No. | Wash Column Water Feed | Acid Content, % |
|---|---|---|
| 10 | 8 cc/min. | 0.03 |
| 50 | do. | 0.04 |
| 100 | do. | 0.06 |
| 150 | do. | 0.06 |
| 201 | 4 cc/min | 0.05 |
| 250 | 2 cc/min | 0.07 |
| 300 | do. | 0.06 |
| 321 | do. | 0.01 |
| 353 | do. | 0.07 |
| 398 | do. | 0.06 |
| 450 | do. | 0.06 |
| 500 | do. | 0.06 |

EXAMPLE 5

To further show the adaptability and efficiency of the instant invention an aqueous glyoxal solution was prepared which contained 0.5 per cent nitric acid, 7.0 per cent acetic acid and 1.7 per cent formic acid and which simulated the solution which is obtained from the nitric acid oxidation of acetaldehyde after removal of excess acetaldehyde. The total acid content was 9.5 per cent calculated as acetic, and the glyoxal content was 12 per cent. The glyoxal solution was treated in a six stage countercurrent extraction using separatory funnels with two volumes of an 18 per cent solution of tricaprylylamine in isopropyl acetate. The acidity of the glyoxal solution which emerged from the sixth extraction stage was 0.01 per cent as acetic. This corresponded to a 99.9 per cent reduction in acidity. In a second experiment, a seventh stage was added to the extraction train in which the organic phase which contained the amine salt was back-extracted with one-fifth volume of water. In this experiment, the acidity of the glyoxal emerging from the extraction train was 0.03 per cent. The acid reduction was 99.7 per cent.

While the preceding description has referred to the nitric acid oxidation of acetaldehyde process for the production of aqueous glyoxal and has illustrated the invention by the use of the product obtained thereby, the process of this invention is suitable for use in purifying any aqueous glyoxal solution containing acidic impurities regardless of the process used in producing the glyoxal. Thus, it is equally useful in purifying aqueous glyoxal solutions produced by the air oxidation of ethylene glycol.

One can also use chlorinated solvents as the organic solvent, such as chloroform or 1,1,2-trichloroethane; however, these are less desirable then those previously set forth because of potential equipment corrosion problems.

Further, while the preferred organic solvents are those previously described having a specific gravity such that the amine solution thereof has a specific gravity less than that of the aqueous glyoxal solution this property is not a strict requirement. In such instances, when the organic solvent has a density greater than that of water, the flows of the solutions are reversed with the organic solvent solution flowing downwardly and the aqueous glyoxal solution flowing upwardly with equal results obtained.

In the following example various solvents are used to remove acid impurities from an aqueous glyoxal solution. The glyoxal concentration was 12 per cent by weight and the solution had an initial total acid impurity content of 1.75 per cent calculated as acetic acid of which 0.45 per cent was nitric acid.

EXAMPLE 6

Five per cent solutions of trioctylamine in the various solvents were prepared, and three volumes of each solution were used to extract one volume of the aqueous glyoxal solution. The extractions were carried out batchwise in separatory funnels at room temperature and atmospheric pressure. Following layer separation, the organic solvent solution was removed and discarded and the aqueous layer was analyzed for total residual acidity calculated as acetic acid. The results are shown below:

| Organic Solvent | Acid Content, % |
|---|---|
| None, control | 1.75 |
| Chloroform | 0.24 |
| Carbon tetrachloride | 0.81 |
| 1,1,1-Trichloroethane | 0.58 |
| 1,1,2-Trichloroethane | 0.19 |
| Trichloroethylene | 0.61 |
| Toluene | 0.78 |
| Heptane | 0.92 |
| Isopropyl ether | 0.79 |
| Isopropyl acetate | 0.35 |
| o-Nitrotoluene | 0.22 |
| Nitrobenzene | 0.19 |
| Ethyl butyl ketone | 0.48 |

What is claimed is:

1. A process for the purification of crude, aqueous solutions of glyoxal which comprises contacting said aqueous solutions with a countercurrent flow of an organic solvent solution containing from about 5 to about 50 weight percent of a high molecular weight tertiary amine or a quarternary ammonium salt thereof in bicarbonate form, wherein said organic solvent is a liquid selected from the group consisting of lower alkyl alkanoates, phenyl alkanoates, lower dialkyl ethers, lower dialkyl ketones, alkanes, monocyclic aromatic hydrocarbons, and said high molecular weight unsubstituted aliphatic saturated or olefinically unsaturated tertiary amine or quarternary ammonium salt thereof in bicarbonate form having at least 17 carbon atoms per nitrogen atom and being essentially water insoluble and organic solvent soluble, at a temperature of from 0°C. to 100°C. for a period of time sufficient to decrease the acid impurities content of said aqueous glyoxal solution and recovering deacidified glyoxal solution of lowered acid content.

2. A process as claimed in claim 1 wherein the crude, aqueous glyoxal solution contains from 5 to 55 per cent by weight of glyoxal.

3. A process as claimed in claim 1 wherein the tertiary amine is tricaprylylamine.

4. A process as claimed in claim 1 wherein the organic solvent is isopropyl acetate.

5. A process as claimed in claim 1 wherein the organic solvent solution is washed to remove picked-up impurities and recycled.

* * * * *